(12) United States Patent
McDonald et al.

(10) Patent No.: US 7,603,792 B1
(45) Date of Patent: Oct. 20, 2009

(54) DRYER HOSE ATTACHMENT APPARATUS

(76) Inventors: Loraine M McDonald, N. 6463 Rye Bluff Rd., Black River Falls, WI (US) 54615; Douglas McDonald, N. 6463 Rye Bluff Rd., Black River Falls, WI (US) 54615

( * ) Notice: Subject to any disclaimer, the term of this patent is extended or adjusted under 35 U.S.C. 154(b) by 82 days.

(21) Appl. No.: 11/854,054

(22) Filed: Sep. 12, 2007

(51) Int. Cl.
*F16B 19/00* (2006.01)

(52) U.S. Cl. .......................................... 34/235; 34/140

(58) Field of Classification Search ................. 285/386, 285/903, 417, 354, 369, 183; 34/87, 235, 34/140
See application file for complete search history.

(56) References Cited

U.S. PATENT DOCUMENTS

| 4,076,280 | A | * | 2/1978 | Young | 285/39 |
| 4,083,410 | A | * | 4/1978 | Anderson | 169/37 |
| 4,251,094 | A | | 2/1981 | Pinto | |
| 4,708,370 | A | | 11/1987 | Todd | |
| 4,746,149 | A | | 5/1988 | Thompson | |
| 4,887,852 | A | * | 12/1989 | Hancock | 285/148.13 |
| 4,998,597 | A | * | 3/1991 | Bainbridge et al. | 181/243 |
| 5,074,697 | A | * | 12/1991 | Blanpain et al. | 403/28 |
| 5,318,328 | A | * | 6/1994 | Dawson | 285/9.1 |
| 5,794,986 | A | * | 8/1998 | Gansel et al. | 285/148.16 |
| 5,842,727 | A | | 12/1998 | Shade | |
| 6,098,312 | A | * | 8/2000 | Tuggle | 34/607 |
| 6,237,969 | B1 | * | 5/2001 | Amatsutsu | 285/357 |
| 6,390,510 | B1 | * | 5/2002 | Tuggle, Jr. | 285/278 |
| D470,282 | S | | 2/2003 | Bjork | |
| 6,584,702 | B2 | * | 7/2003 | Irey | 34/417 |
| 6,640,461 | B1 | * | 11/2003 | Berger | 34/140 |
| 6,817,632 | B1 | | 11/2004 | You et al. | |
| 6,908,114 | B2 | | 6/2005 | Moner | |
| 7,421,804 | B1 | * | 9/2008 | Hession | 34/601 |
| 2002/0079702 | A1 | | 6/2002 | Baumann et al. | |
| 2005/0184524 | A1 | | 8/2005 | Stravitz | |

* cited by examiner

*Primary Examiner*—David E Bochna
(74) *Attorney, Agent, or Firm*—Crossley Patent Law; Mark A. Crossley

(57) ABSTRACT

The dryer hose attachment apparatus provides a coupling with more than one embodiment. Each coupling rotationally engages the outlet hose provided for the dryer and the initial hose of a flex hose provided for exhausting air from a dryer environment. Each coupling provides for sealing the dryer exhaust air, from the dryer to the flexible exhaust hose. Each coupling provides for the apparatus to be fitted and to operate in close confines typical to clothes dryer environments. The flange of the dryer attachment may be fixed to the dryer via fasteners. The interior of the outlet hose of the dryer attachment provides sizing for interference fit around an existing hose which exits a dryer. And, both means of engagement may be employed.

8 Claims, 2 Drawing Sheets

DRYER HOSE ATTACHMENT APPARATUS

BACKGROUND OF THE INVENTION

A clothes dryer is typically fitted with a rigid outlet hose, often made of galvanized metal, which is then somehow connected to an exhaust hose for channeling exhaust air from the dryer to a more distant area, thereby channeling moisture, heat, and lint away from the immediate dryer environment. Typically, the smooth sided galvanized dryer outlet pipe is coupled to the flexible exhaust hose via a simple clamp. Often such clamps are molded into the flexible exhaust hose. Those familiar with such realize more than one associated problem. First, the flex hoses are difficult to fit around the dryer outlet, with very little difference between flex hose inside diameter (ID) and dryer outlet hose outside diameter (OD). Even once fitted, the typical clamps are often easily disengaged, especially with moving a dryer to clean around it or to recover dropped clothing and items which often fall and are trapped around dryer confines.

A problem also exists with another means for clamping the exhaust hose to the dryer outlet hose wherein the exhaust hose is provided with no integrated clamp, and an independent screw clamp encircles the exhaust hose and is tightened thereabout. The exhaust hose is virtually always integrated with a spiral wire to add structural integrity. Clamping the hose clamp around the spiral wire and hence the exhaust hose and the dryer outlet does not provide a positive seal, adding to hot air and lint leakage from the connection. Yet another problem exists when the dryer outlet hose is in close proximity to the dryer wall, severely limiting any attempt to try to tighten any form of clamp around the hoses. Attempting to solve these issues with a male threaded dryer outlet and female threaded exhaust hose finds that the exhaust hose cannot be rotated, as it is typically embedded in a wall or the like, making rotation impossible. What is needed is an apparatus which provides positive connection between a dryer outlet hose and an exhaust hose, one which welcomes installation in the typically tight confines of dryer location. The present apparatus fulfills this need.

FIELD OF THE INVENTION

The dryer hose attachment apparatus relates to a device for coupling a rigid hose to a flex hose and more especially to a dryer hose attachment apparatus which provide for a positive connection to the dryer and dryer outlet and a freely rotating connection to the flex hose for exhausting dryer air.

SUMMARY OF THE INVENTION

The general purpose of the dryer hose attachment apparatus, described subsequently in greater detail, is to provide a dryer hose attachment apparatus which has many novel features that result in an improved dryer hose attachment apparatus which is not anticipated, rendered obvious, suggested, or even implied by prior art, either alone or in combination thereof.

To attain this, the dryer hose attachment apparatus provides a coupling with more than one embodiment. Each coupling rotationally engages the outlet hose provided for the dryer and the initial hose of a flex hose provided for exhausting air from a dryer environment. Each coupling provides for sealing the dryer exhaust air, from the dryer to the flexible exhaust hose. Each coupling provides for the apparatus to be fitted and to operate in close confines typical to clothes dryer environments. The dryer attachment of the apparatus provides for more than one means of fit to the dryer. The flange of the dryer attachment may be fixed to the dryer via fasteners. The interior of the outlet hose of the dryer attachment provides sizing for interference fit around an existing hose which exits a dryer. And, both means of engagement may be employed.

Thus has been broadly outlined the more important features of the improved dryer hose attachment apparatus so that the detailed description thereof that follows may be better understood and in order that the present contribution to the art may be better appreciated.

An object of the dryer hose attachment apparatus is to provide a positive seal to a dryer.

Another object of the dryer hose attachment apparatus is to provide a positive seal to an exhaust for a dryer.

A further object of the dryer hose attachment apparatus is to provide a flexible exhaust hose for a dryer.

An added object of the dryer hose attachment apparatus is to provide a positive seal between a dryer an a flexible exhaust hose.

And, an object of the dryer hose attachment apparatus is to provide for rotational engagement between a dryer outlet hose and a flexible exhaust hose.

These together with additional objects, features and advantages of the improved dryer hose attachment apparatus will be readily apparent to those of ordinary skill in the art upon reading the following detailed description of presently preferred, but nonetheless illustrative, embodiments of the improved dryer hose attachment apparatus when taken in conjunction with the accompanying drawings.

In this respect, before explaining the current embodiments of the improved dryer hose attachment apparatus in detail, it is to be understood that the dryer hose attachment apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved dryer hose attachment apparatus.

It is therefore important that the claims be regarded as including such equivalent constructions insofar as they do not depart from the spirit and scope of the dryer hose attachment apparatus. It is also to be understood that the phraseology and terminology employed herein are for purposes of description and should not be regarded as limiting.

DETAILED DESCRIPTION OF THE DRAWINGS

With reference now to the drawings, and in particular FIGS. 1 through 5 thereof, the principles and concepts of the dryer hose attachment apparatus generally designated by the reference number 10 will be described.

Figure 1:
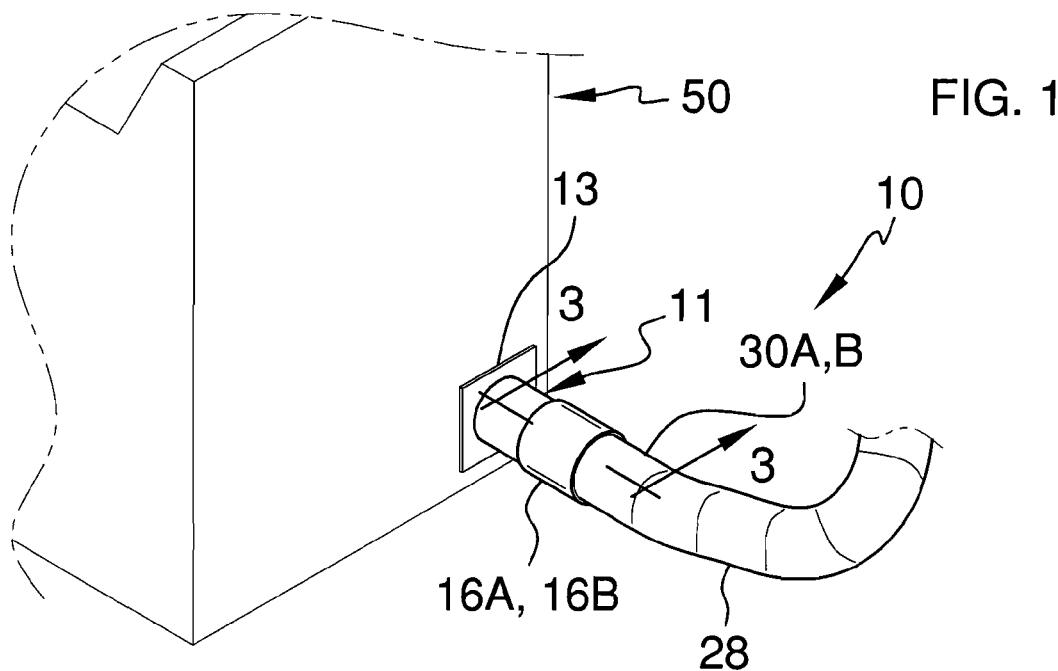
FIG. 1 is a perspective view of the apparatus installed.
Figure 2:
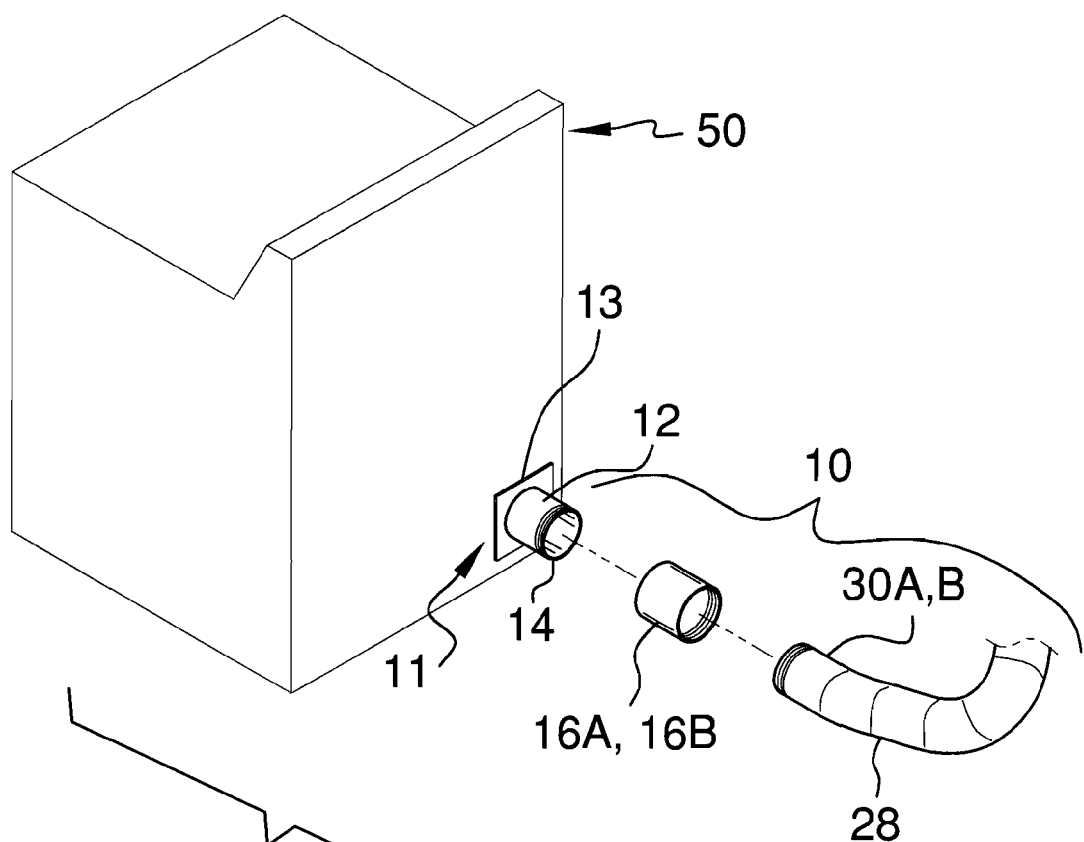
FIG. 2 is an exploded perspective view of the apparatus.

Referring to FIGS. 1 and 2, the dryer hose attachment apparatus 10 provides for a positive connection to a dryer 50. The apparatus 10 is provided with more than one embodiment of coupling in the form of grooved coupling 16A and threaded coupling 16B. The couplings 16A and 16B, alternately, positively engage the dryer attachment 11 and the initial hose 30.

The dryer attachment 11 attaches to a typical clothes dryer 50. The flange 13 of the dryer attachment 11 provides for positive engagement with the dryer 50. The flex hose 28 provides for flexibly fitting the apparatus to accommodate various dryer environment exhaust avenues.

Figure 3:
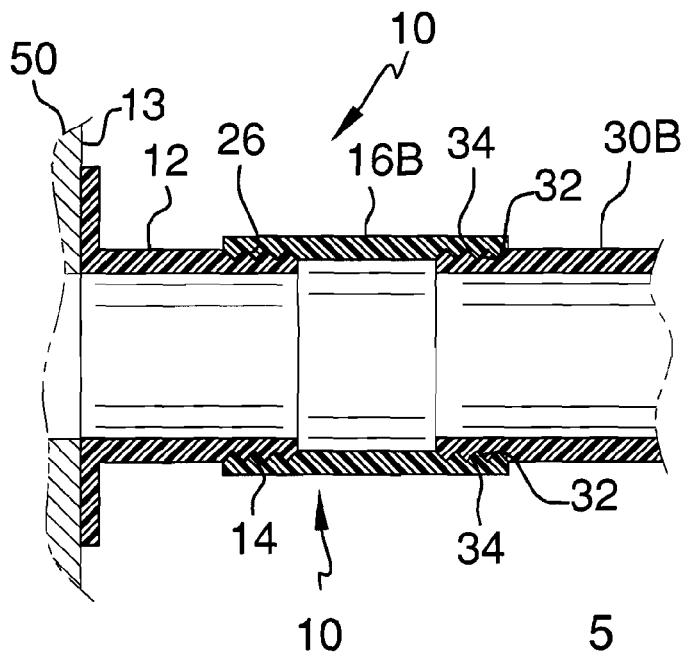
FIG. 3 is a cross sectional view of FIG. 1.
Figure 4:
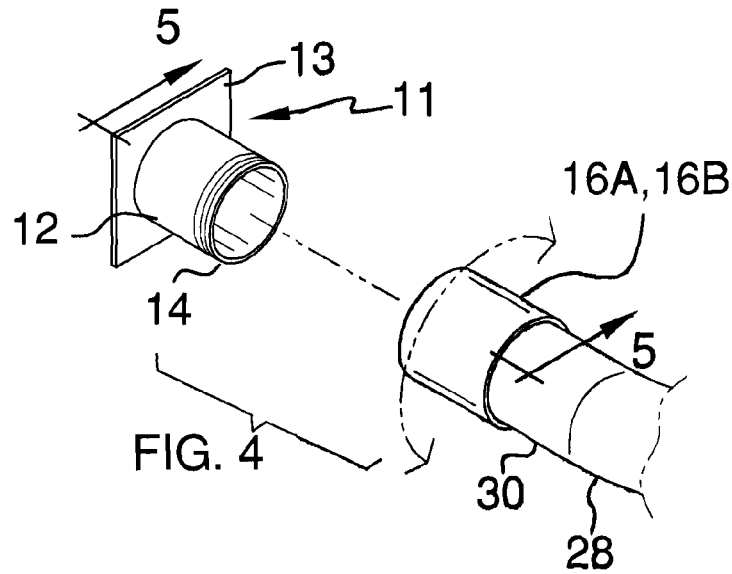
FIG. 4 is a perspective view of the apparatus in preparation of engagement with the dryer outlet hose.

Referring to FIGS. 2, 3 and 4, the dryer hose attachment apparatus 10 is provided with the threaded coupling 16B. The dryer attachment 11 has a first end and a second end. The dryer attachment 11 further comprises a flange 13 on the first end for attachment to the dryer 50. The flange 13 may be attached via fasteners or the like. The rigid outlet hose 12 is affixed to the flange 13. The interior of the rigid outlet hose 12 may be optionally snugly interference fitted around the exterior of an existing hose exiting the dryer 50. The male thread 14 is disposed on the outlet hose 12 of the second end of the dryer attachment 11. The threaded coupling 16B provides for removable attachment to the second end of the dryer attachment 11. The threaded coupling 16B further comprises a female thread 26 within the first end of the threaded coupling 16B. The reverse female thread 32 is disposed within the second end of the threaded coupling 16B. The rigid initial hose 30B has a reverse male thread 34 on the first end. The flexible length of flex hose 28 is affixed to the initial hose 30B.

The length of the threaded coupling 16B is illustrated as having a distance between the female thread 26 and the reverse female thread 32. Another embodiment of the threaded coupling 16B is provided comprising a reduced length and no distance between the female thread 26 and the reverse female thread 32. Rotational movement of the threaded coupling 16B engages the threaded coupling 16B to the rigid outlet hose 12 and the rigid initial hose 16B simultaneously.

Figure 5:
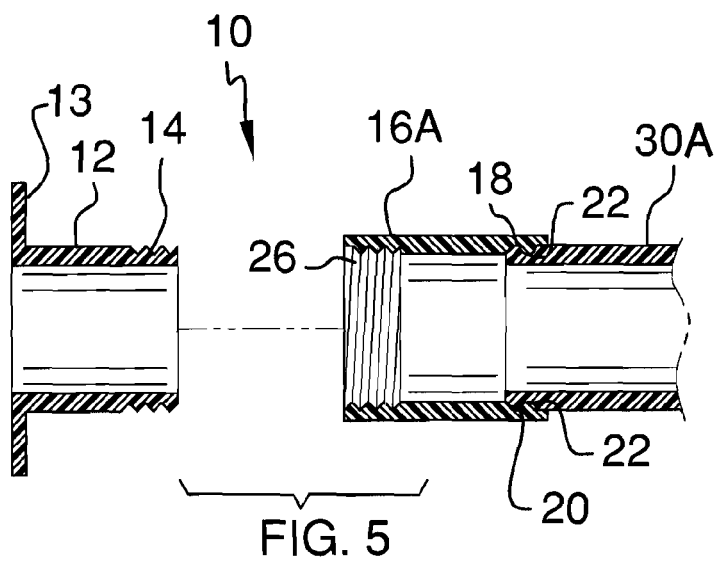
FIG. 5 is a cross sectional view of FIG. 4.

Referring to FIGS. 2, 4 and 5, the dryer hose attachment apparatus 10 provides for fit to a clothes dryer 50 or the like. The apparatus 10 comprises the dryer attachment 11 having a first end and a second end. The dryer attachment 11 further comprises the flange 13 on the first end for attachment to the dryer 50. The flange 13 may be attached via fasteners or the like. The rigid outlet hose 12 is affixed to the flange 13. The interior of the rigid outlet hose 12 may be optionally snugly interference fitted around the exterior of an existing hose exiting the dryer 50. The male thread 14 is disposed on the outlet hose 12 of the second end of the dryer attachment 11. The grooved coupling 16A is provided for removable attachment to the second end of the dryer attachment 11. The grooved coupling 16A further comprises a female thread 26 within the first end of the grooved coupling 16A. The second male rib 22 is disposed within the second end of the grooved coupling 16A. The groove 20 is disposed within the second end of the grooved coupling 16A. The groove 20 is disposed inboard and adjacent to the second male rib 22. The length of the threaded coupling 16A is illustrated as having a distance between the female thread 26 and the groove 20.

Another embodiment of the grooved coupling 16A is provided comprising a reduced length and no distance between the female thread 26 and the groove 20. The rigid initial hose 30A has the first male rib 18 disposed on the exterior of the first end. The groove 20 is disposed on the exterior of the initial hose 30A. The groove 20 is adjacent to and inboard of the first male rib 18. The first male rib 18 and the groove 20 of the initial hose 30A thereby rotatably fit within the groove 20 and the second male rib 22 of the grooved coupling 16A and provide for rotation of the grooved coupling 16A while simultaneously providing a positive seal between the grooved coupling 16A and the initial hose 16A. The flexible length of flex hose 28 is affixed to the initial hose 30A. Rotation of the grooved coupling 16A engages the grooved coupling 16A to the rigid outlet hose 12.

With respect to the above description then, it is to be realized that the optimum dimensional relationships for the parts of the dryer hose attachment apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the dryer hose attachment apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the dryer hose attachment apparatus may be used.

Therefore, the foregoing is considered as illustrative only of the principles of the dryer hose attachment apparatus. Further, since numerous modifications and changes will readily occur to those skilled in the art, it is not desired to limit the dryer hose attachment apparatus to the exact construction and operation shown and described, and accordingly, all suitable modifications and equivalents may be resorted to, falling within the scope of the dryer hose attachment apparatus.

What is claimed is:

1. A dryer hose attachment apparatus for fit to a clothes dryer, comprising:
    a dryer attachment having a first end and a second end, the dryer attachment further comprising:
        a flange on the first end for attachment to the dryer;
        a rigid outlet hose affixed to the flange;
    whereby the flange is affixed to an exterior of the clothes dryer and the rigid outlet hose insertably attaches into a threaded coupling;
    a male thread on the outlet hose of the second end of the dryer attachment;
    the threaded coupling removably attached to the second end of the dryer attachment, the threaded coupling further comprising:
        a female thread within a first end of the coupling;
    whereby rotational movement of the threaded coupling engages the threaded coupling to the rigid outlet hose;
    a flexible hose attached to a second end of the threaded coupling.

2. The apparatus according to claim 1 wherein the attachment of the flexible hose to the threaded coupling second end further comprises a rigid initial hose disposed between the threaded coupling second end and the flexible hose.

3. The apparatus according to claim 2 wherein the attachment of the threaded coupling second end to the initial hose further comprises rotational capability.

4. The apparatus according to claim 3 wherein the threaded coupling further comprises a length between the female thread and the second end.

5. The apparatus according to claim 2 wherein the threaded coupling further comprises a length between the female thread and the second end.

6. The apparatus according to claim 1 wherein the threaded coupling further comprises a length between the female thread and the second end.

7. A dryer hose attachment apparatus for fit to a clothes dryer, comprising:

a dryer attachment having a first end and a second end, the dryer attachment further comprising:
a flange on the first end for attachment to the dryer;
a rigid outlet hose affixed to the flange;
whereby the flange is affixed to an exterior of the clothes dryer and the rigid outlet hose insertably attaches into a threaded coupling;
a male thread on the outlet hose of the second end of the dryer attachment;
the threaded coupling removably attached to the second end of the dryer attachment, the threaded coupling further comprising:
a female thread within a first end of the coupling;
a reverse female thread within a second end of the coupling;
a rigid initial hose having a reverse male thread on a first end;
a flexible length of flex hose affixed to the initial hose,
whereby rotational movement of the threaded coupling engages the threaded coupling to the rigid outlet hose and the rigid initial hose simultaneously.

8. The apparatus according to claim 7 wherein the threaded coupling further comprises a length between the female thread and the reverse female thread.

* * * * *